(12) United States Patent
Hurtta et al.

(10) Patent No.: US 7,970,376 B2
(45) Date of Patent: Jun. 28, 2011

(54) CHARGING EFFICIENCY

(75) Inventors: Tuija Hurtta, Espoo (FI); Tero Mäkelä, Helsinki (FI); Kai Sjöblom, Espoo (FI)

(73) Assignee: Nokia Corporation (FI)

( * ) Notice: Subject to any disclaimer, the term of this patent is extended or adjusted under 35 U.S.C. 154(b) by 595 days.

(21) Appl. No.: 11/930,950

(22) Filed: Oct. 31, 2007

(65) Prior Publication Data

US 2008/0064366 A1 Mar. 13, 2008

Related U.S. Application Data

(63) Continuation of application No. 11/221,163, filed on Sep. 7, 2005, now Pat. No. 7,565,134, which is a continuation of application No. 09/889,862, filed as application No. PCT/IB00/01887 on Nov. 22, 2000, now Pat. No. 6,975,850.

(30) Foreign Application Priority Data

Nov. 22, 1999 (GB) .................................. 9927597.6

(51) Int. Cl.
*H04M 11/00* (2006.01)
(52) U.S. Cl. ........................................ 455/405; 455/407
(58) Field of Classification Search .................. 455/406, 455/407, 408, 433; 379/114.01, 114.03, 379/114.21, 114.23, 115.01–115.03; 370/902, 370/912, 913
See application file for complete search history.

(56) References Cited

U.S. PATENT DOCUMENTS

| | | | |
|---|---|---|---|
| 5,828,737 A | 10/1998 | Sawyer | .................... 379/114.07 |
| 5,912,888 A | 6/1999 | Walsh et al. | |
| 5,982,767 A | 11/1999 | McIntosh | |
| 6,023,618 A | 2/2000 | Janhonen et al. | ............. 455/406 |
| 6,061,556 A | 5/2000 | Rahman | ........................ 455/406 |
| 6,115,600 A | 9/2000 | Tuohino et al. | ............... 455/405 |

(Continued)

FOREIGN PATENT DOCUMENTS

EP 483857 A2 7/1997

(Continued)

OTHER PUBLICATIONS

TSG-SA Working Group 2 Meeting #3, IP Domain User Plane on Iu, XP-002254110, Alcatel, Apr. 19-21, 1999.

(Continued)

*Primary Examiner* — Sam Bhattacharya
(74) *Attorney, Agent, or Firm* — Banner & Witcoff, Ltd.

(57) ABSTRACT

A method for performing charging in a telecommunications system, comprising: storing at a subscriber information store subscription information including charging arrangement information indicative of the charging arrangement for a first communication terminal operating in the telecommunications system; providing by means of packet data interface apparatus packet data communication services to the first terminal, the packet data interface apparatus being capable of interfacing between the first communication terminal and a packet-switched data link to another communications terminal; generating by means of packet data interface apparatus charging messages indicative of the usage of the packet data communication services by the first terminal; transferring the charging messages to charging apparatus; and performing by means of the charging apparatus a charging operation to attribute to a subscriber for the first communications terminal a charge for use of the communication services by the first terminal; the method further including the steps of: transferring the charging arrangement information to the packet data interface apparatus; and storing at the packet data interface apparatus the charging arrangement information for the first communication terminal; and wherein the stop of generating charge messages comprises generating the said charging messages dependant on the charging arrangement information for the first communication terminal.

28 Claims, 2 Drawing Sheets

U.S. PATENT DOCUMENTS

| | | | |
|---|---|---|---|
| 6,154,643 A | 11/2000 | Cox | 455/406 |
| 6,157,617 A | 12/2000 | Brandin et al. | 370/252 |
| 6,169,891 B1 | 1/2001 | Gorham et al. | 455/408 |
| 6,195,543 B1 | 2/2001 | Granberg | 455/407 |
| 6,208,977 B1 | 3/2001 | Hernandez et al. | 705/34 |
| 6,311,054 B1 | 10/2001 | Korpela | 455/406 |
| 6,434,537 B1 | 8/2002 | Grimes | 705/40 |
| 6,480,485 B1 | 11/2002 | Kari et al. | 370/352 |
| 6,483,910 B1 | 11/2002 | Council | 379/127.01 |
| 6,496,689 B1 | 12/2002 | Keller et al. | 455/406 |
| 6,496,690 B1 | 12/2002 | Cobo et al. | 455/408 |
| 6,542,728 B1 | 4/2003 | Kaku et al. | 455/406 |
| 6,560,460 B1 | 5/2003 | Hormeman et al. | 455/452.2 |
| 6,597,776 B1 | 7/2003 | Walker et al. | 379/114.26 |
| 6,671,285 B1 | 12/2003 | Kirby et al. | 370/468 |
| 6,760,417 B1 | 7/2004 | Wallenius | 379/114.28 |
| 6,885,857 B1 | 4/2005 | Hanson | 455/406 |
| 2001/0018337 A1 | 8/2001 | Donovan et al. | 455/406 |
| 2005/0191989 A1 | 9/2005 | Plush et al. | 455/406 |
| 2006/0058006 A1 | 3/2006 | Hurtta et al. | 455/405 |

FOREIGN PATENT DOCUMENTS

| | | |
|---|---|---|
| WO | WO 97/26739 | 7/1997 |
| WO | WO97/26739 A1 | 7/1997 |
| WO | WO99/27723 | 6/1999 |
| WO | WO 99/27723 | 6/1999 |

OTHER PUBLICATIONS

EPO Examination Report, dated Mar. 3, 2006.

Michaelas, Nicos; Chittenden, Francis; Poutziouris, Pannikkos, "Pay and Save", Accountancy, Londo, Jun. 1999 vol. 123, iss. 1270; p. 92; retrieved from ProQuest Feb. 9, 2006 (2 pages).

Experience with Operating Packet Switching Public Data Networks; Guinaudeau, P.; Journal: Austrailian Telecommunication Research vol. 16,No. 3; pp. 33-38(1982), in Australia.

Accounting Architecture for Cellular Networks; Anand, S.S.; Kasturi, K., Sriram, G.; (1996) pp. 184-189, IEEE, in USA.

Billing for Appeal; Fulton, F.; Journal: Telecommunications (International Edition) vol. 33, No. 11; pp. 62, 64, 66, Horizon House Publications (1999), in USA.

Chinese Office Action dated Mar. 18, 2010 for Application Serial No. 200810001281.7.

Chinese Office Action dated Sep. 1, 2010 for Application Serial No. 200810001281.7.

US 7,970,376 B2

CHARGING EFFICIENCY

RELATED APPLICATION

This application is a continuation of U.S. patent application Ser. No. 11/221,163, filed on Sep. 7, 2005 now U.S. Pat No. 7,565,134, which is a continuation of U.S. patent application Ser. No. 09/889,862, filed Jan. 7, 2002 now U.S. Pat. No. 6,975,850, which claims priority to PCT International Application No. PCT/IB00/01887, filed Nov. 22, 2000, which claims priority to United Kingdom Application No. 9927597.6, filed Nov. 22, 1999, all of which are incorporated herein by reference in their entirety.

This invention relates to methods and apparatus directed towards relatively efficient charging in a telecommunications system. The invention is especially, but not exclusively, suitable for implementation in the proposed UMTS (Universal Mobile Telecommunications System)/GPRS (general packet radio system) architecture.

BACKGROUND OF THE INVENTION

FIG. 1 shows the general logical architecture proposed for UMTS/GPRS and also suitable for other systems. A mobile station (MS) 1 can communicate by radio with one or more base stations (BS) 2. The respective network element in GPRS is called a BTS (base transceiver station). Each base station is linked to a single radio network controller (RNC) 4. The respective network element in GPRS is called a BSC (base station controller). Each RNC can be linked to one or more BSs. Each RNC is linked to a core network (CN) 5. The CN includes one or more serving nodes that can provide communication services to a connected mobile station, for example a mobile switching centre (MSC) 7 and a serving GPRS (general packet radio service) support node (SGSN) 8. These units are connected to the RNCs. The CN 5 is also connected to other telecommunications networks such as a fixed line network 9, other mobile networks (e.g. another core network 12, not shown in detail in FIG. 1) or packet data networks 10, 11 such as the internet or proprietary networks to allow onward connection of communications outside the UMTS network. The CN also includes other units such as a home location register (HLR) 13 and a visitor location register (VLR) 14 which help to control access to the network. The HLR 13 stores the subscription details of mobile station subscribers to that CN itself. The VLR stores information on mobile stations that are currently attached to the CN. The BSs and the RNCs constitute a UMTS terrestrial radio access network (UTRAN). Each core network includes one or more charging gateway functionality entities 15, 16 and a billing system 17, 18 for performing billing operations. (In GPRS, for example, If the charging gateway functionality is embodied in a separate physical unit then the corresponding network element is known as a charging gateway (CG)). Each network entity generating charging information (like GGSN and SGSN in GPRS) is linked at least to one charging gateway functionality (CGF), but for redundancy reasons typically to several CGFs. (The charging gateways may also be linked together.) When a mobile station is operating in another core network from the one to which it is subscribed (its home network), that other core network can communicate charging information to the home network by means of the charging gateways and billing systems so that the home network can bill the subscriber for his use of the other core network.

In the core network each serving node such as an MSC or SGSN can provide a set of services to the mobile station. For example:

An MSC can provide circuit switched (CS) communications, for example for speech, fax or non-transparent data services, and therefore has a link to other entities in the circuit switched domain such as other CS mobile networks such as GSM (Global System for Mobile communications) and CS fixed wire networks such as conventional voice telephony networks.

An SGSN can provide packet switched (PS) communications, for example for packet data protocol (PDP) contexts for internet protocol (IP) data transmission, and therefore has a link to other entities in the packet switched domain such as GPRS-equipped GSM networks and the internet. The packet switched services may include traditional data services such as file transfer, e-mail and world-wide web (WWW) browsing and derived data services such as voice-over-IP (e.g. by means of the H.323 protocol).

The division of services between serving nodes is specified in the system specification and is tied to the assumed network architecture. There may be other nodes than the MSC or SGSN providing overlapping or additional services.

When a mobile station begins operating for communication in the coverage area of the core network it first undergoes a process of attachment to the core network. In that process the mobile station indicates its identity, and then undergoes a process of attachment to the network. The core network obtains subscription information for the mobile station from the HLR of the core network to which the mobile station is subscribed. The subscription information includes access information indicating the services that the mobile station is entitled to receive (e.g. the access points—for example in a GGSN—to which the mobile station may have access), and billing information indicating the method by which the subscriber is billed (e.g. normal subscription, pre-paid subscription, hot billing subscription or flat rate subscription; and whether billing is to be dependant on the access point that is used). Using that information the core network can provide services to the mobile station and cause the subscriber to be billed accordingly. After having attached to the network the mobile station may communicate to the core network its need for communication services, for example involving activation of a PDP context in the GPRS system.

In some systems, e.g. GPRS, CDR (call detailed record) tickets or other charging messages are collected by the charging gateway functionality and sent onwards as a file towards the appropriate billing system periodically, and after some delay. For example, such files may be sent every 10 or 30 minutes. In hot billing the messages are typically sent promptly towards the appropriate billing system or billing server after no delay or only a few seconds' delay. This can enable services such as advice of charge (AoC) and pre-paid subscriptions to be provided more effectively.

The core network includes gateway equipment 19, 20, 21 for interfacing with the other networks 9, 10, 11. Where the respective other network is a packet switched network (e.g. networks 10, 11) the gateway equipment is a GGSN (gateway GPRS support node), which interfaces between the SGSN 8 and the respective network. During a communication session and/or after a session has been completed the GGSN through which the session was routed generates one or more CDR ticket messages which are directed to the appropriate charging system so that the subscriber can be billed for the session.

Under a so-called normal charging arrangement a subscriber is charged simply on the basis of the duration of sessions initiated by his mobile station, or a like measure such as the amount of data sent and/or received by the mobile station (e.g. the number of data octets sent and received). This arrangement is served efficiently by the above charging method. However, alternative charging arrangements are becoming increasingly popular with subscribers. These arrangements include:
1. pre-paid billing, in which a subscriber makes a prepayment for sessions in advance and the costs of sessions that are made are deducted from the prepayment; and
2. flat rate subscription, in which a subscriber is charged a fixed amount irrespective of how many sessions he makes.

The inventors of the present invention have identified that the charging of the latter arrangements could potentially be achieved more efficiently if there were a means whereby the sending of CDR ticket messages (or other analogous charging messages) could be better adapted to those arrangements.

BRIEF SUMMARY OF THE INVENTION

According to one aspect of the present invention there is provided A method for performing charging in a telecommunications system, comprising: storing at a subscriber information store subscription information including charging arrangement information indicative of the charging arrangement for a first communication terminal operating in the telecommunications system; providing by means of packet data interface apparatus packet data communication services to the first terminal, the packet data interface apparatus being capable of interfacing between the first communication terminal and a packet-switched data link to another communications terminal; generating by means of the packet data interface apparatus charging messages indicative of the usage of the packet data communication services by the first terminal; transferring the charging messages to charging apparatus; and performing by means of the charging apparatus a charging operation to attribute to a subscriber for the first communications terminal a charge for use of the communication services by the first terminal; the method further including the steps of: transferring the charging arrangement information to the packet data interface apparatus; and storing at the packet data interface apparatus the charging arrangement information for the first communication terminal; and wherein the step of generating charging messages comprises generating the said charging messages dependant on the charging arrangement information for the first communication terminal.

According to a second aspect of the present invention there is provided a telecommunications system, comprising: a subscriber information store storing subscription information including charging arrangement information indicative of the charging arrangement for a first communication terminal operating in the telecommunications system; packet data interface apparatus for providing packet data communication services to the first terminal, the packet data interface apparatus being capable of interfacing between the first communication terminal and a packet-switched data link to another communications terminal, and generating charging messages indicative of the usage of the packet data communication services by the first terminal; message transfer apparatus for transferring the charging messages to charging apparatus capable of performing a charging operation to attribute to a subscriber for the first communications terminal a charge for use of the communication services by the first terminal; and wherein the packet data interface apparatus is adapted to receive and store the charging arrangement information for the first communication terminal and to generate the said charging messages dependant on the charging arrangement information for the first communication terminal.

Suitably the step of generating the charging messages comprises: determining on the basis of the charging arrangement information for the first communication terminal stored at the packet data interface apparatus whether a communication with the first terminal is liable to charging; and generating a charging message for the communication if the communication is liable to charging. In one preferred embodiment such a message is generated only if the communication is liable to charging. In another preferred embodiment such a message is not generated if the communication is not liable to charging. In another preferred embodiment such a message may also be generated regardless of liability of the charging. This would give an operator an option to check and control charging related information. Suitably, it is determined that a communication is not liable for charging if charging arrangement information for the first communication terminal stored at the packet data interface apparatus indicates that the communication is subject to flat rate payment and/or pre-payment and/or is not to be charged for.

An example of a communication that may not be to be charged for is the carrying of call setup messages.

The charging message may be indicative of the duration and/or type of the communication and/or the amount of data transmitted and/or received by the first communication terminal and/or of the identity of the first communication terminal. The charging message may be a CDR ticket or the like.

The step of transferring the charging arrangement information to the packet data interface apparatus may preferably be performed during attachment of the first communication terminal to the telecommunications system. Alternatively it may be performed afterwards.

The subscriber information store is preferably a home location register or the like.

The packet data interface apparatus is suitably capable of interfacing between a packet radio connection with the first communication terminal and a packet-switched data link to the other communications terminal. The packet radio connection may be a general packet radio service (GPRS) connection. The packet data interface apparatus may comprise a serving GPRS support node (SGSN). The charging arrangement information for the first communication terminal may then be stored at the SGSN. The packet data interface apparatus may comprise a gateway GPRS support node (GGSN). The charging arrangement information for the first communication terminal may then by stored at the GGSN.

Suitably the step of transferring the charging arrangement information to the packet data interface apparatus comprises transferring the charging arrangement information to the SGSN. There may then be a step of transferring the charging arrangement information from the SGSN to the GGSN. Alternatively, the information may go directly to the GGSN.

The step of determining whether a communication with the first terminal is liable to charging is preferably performed by means of the SGSN, although it could be performed additionally or alternatively by the GGSN or another item of equipment. The step of generation of the charging messages is preferably performed by means of the GGSN and the SGSN; alternatively it could be performed by one of those entities with or without or another item of equipment.

The telecommunications system may be a radio telephone system and/or a mobile telephone system. The first terminal and the system may be adapted such that there can be communication between the first terminal and the packet data interface apparatus by means of a radio link, for example between the first terminal and a base station, or a plurality of parallel radio links (e.g. in a soft handover condition). The telecommunications system may be a universal mobile telecommunications system (UMTS) system or any other appropriate system. The first terminal may be a mobile station. Such a station may be physically mobile or may be fixed in location.

DESCRIPTION OF THE DRAWINGS

The present invention will now be described by way of example with reference to the accompanying drawings, in which.

DETAILED DESCRIPTION OF THE PREFERRED EMBODIMENTS

Figure 1:
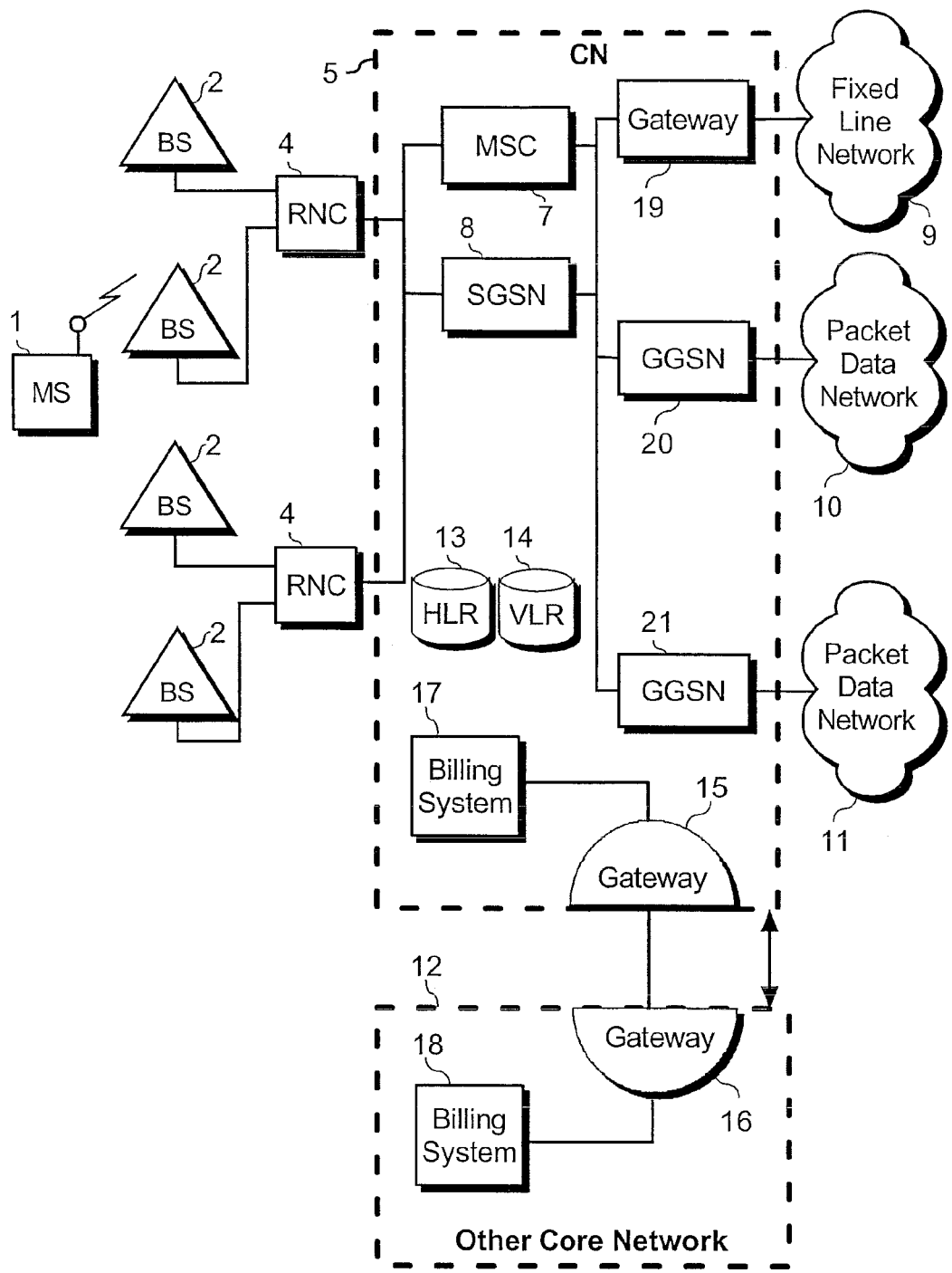
FIG. 1 is a schematic diagram of the currently-proposed architecture for a UMTS telecommunications system.
Figure 2:
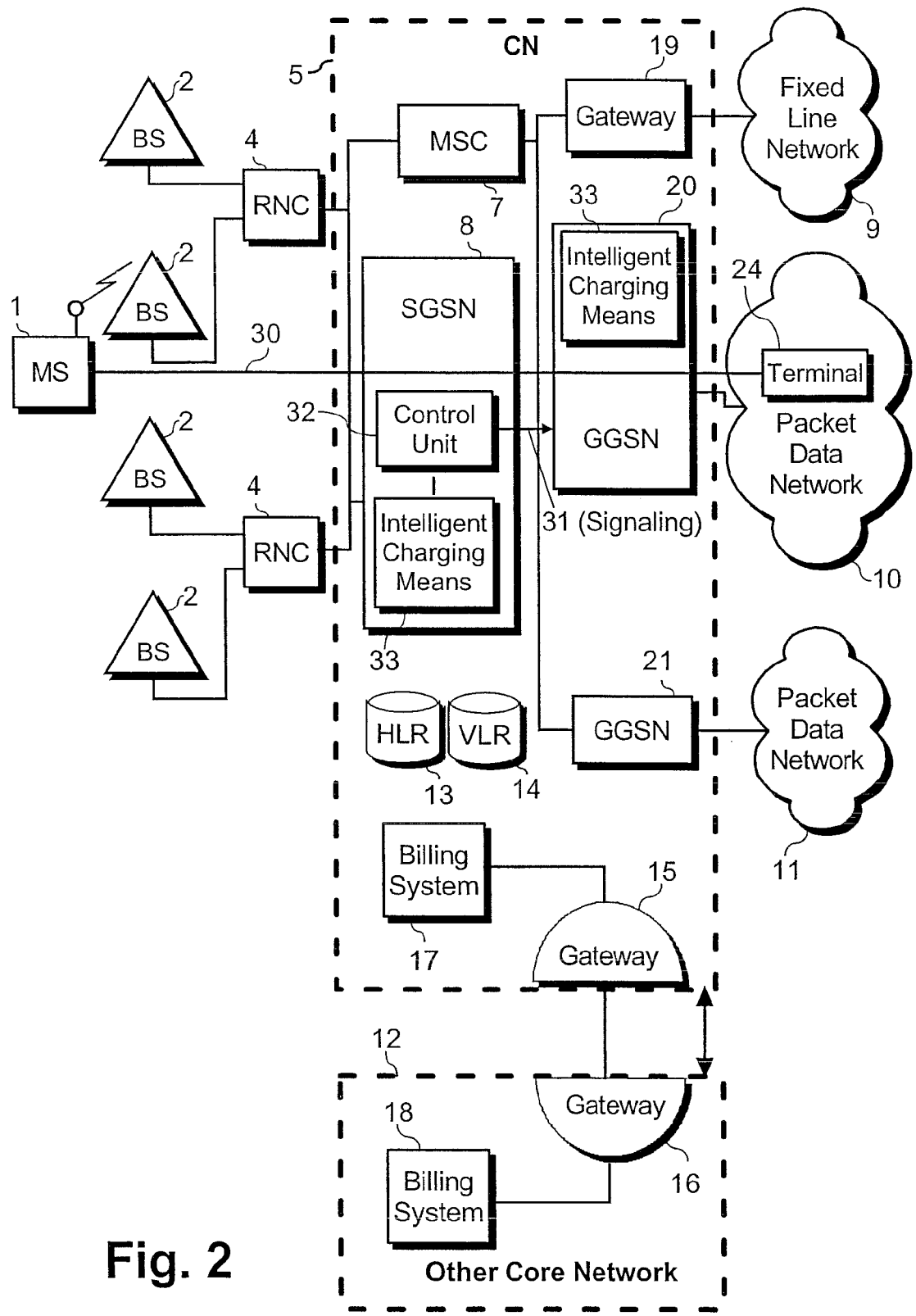
FIG. 2 is a schematic diagram of an architecture for a UMTS telecommunications system including an enhanced charging system.

For illustration of the present invention relevant aspects of the UMTS architecture will now be described in more detail with reference to FIG. 2. In FIG. 2 like components are indicated as for FIG. 1.

The core network 5 is capable of supporting data communications between a mobile station operating in the coverage area of a base station serving the network and another terminal. That terminal could be a mobile station in that coverage area (in which case the connection can be handled entirely within the core network) or another data-compatible terminal in another network connected to the core network. In the latter case, for example, the path of the connection is from the mobile station via radio to one or more base stations and then by communication links (normally fixed line communication links) from the base station(s) to the respective RNC 4 the SGSN 8 of the core network, the appropriate GGSN (e.g. GGSN 20) of the core network and then to the other network (e.g network 10) and a terminal 24 operating in it. This path is indicated at 30 in FIG. 2. The function of the SGSN and the GGSN is to interface between the GPRS protocol used over the radio interface with the mobile station and the packet switched protocol used in the respective other network.

When a mobile station attaches to the core network it identifies itself by means of an identification code. That code includes an indication of the network to which the mobile station is subscribed (its home network). The home network of the mobile station comprises an HLR database that includes subscription data (a subscriber profile) for the mobile station. In order to provide the mobile station with communication services the core network needs to obtain that subscription data—in particular in order to determine to what services the mobile station may be allowed access and to determine how the subscriber of the mobile station is to be billed for services that are used. The core network therefore addresses the HLR of the mobile station's home network and in response receives the subscription data for the mobile station. (The mobile station's home network may be the core network itself, in which case the data is available from the core network's own HLR). If the subscription data indicates that the mobile station may receive communication services from the core network then the core network arranges for the capability to provide the mobile station with those services.

In the system of FIG. 2 the subscription information for the mobile station is passed to the SGSN of the core network so that the SGSN may supervise access to the services, and improve the efficiency of charging in the system as described below.

The information in the subscription data that indicates the services to which the mobile station may have access may include several aspects of data. These may be referred to as policing criteria. The information may indicate what types of services are to be available to the mobile station: for instance voice, data or messaging services. It may indicate that the availability of any of those services is dependant on factors such as the time of day (for example the mobile station may be allowed to initiate sessions only at off-peak times), or the access point(s), which are suitably in the GGSN, that are used by the mobile station, or the location of the mobile station. For example, the mobile station may be restricted to accessing the network from one or more base stations near an employer's office. Other information in the policing criteria may indicate whether network activated PDP context activations are allowed to the mobile station.

The information in the subscription data that indicates the charging policy to be used for the mobile station may also include several aspects of data. It may indicate the charging arrangement (normal, pre-paid etc.) to be applied to the mobile station. The charging arrangement may be different for different types of services. The charging policy to be applied to the mobile station may be dependant on factors such as the date or time of day and the access point (referred to as APN—access point name) that is used. For example, one arrangement that may well become commonplace is for a subscriber to be charged a fixed fee for all sessions made at one APN (at the subscriber's home or office) and for sessions made at other APNs to be billed normally. In this arrangement there could be no need for charging messages for the sessions made at the said one APN because those sessions are not billed for individually. However, charging messages are needed for sessions from elsewhere. Other possibilities are that all use of a certain APN may be uncharged.

When the mobile station has registered successfully with the core network it can make and receive data by means of communication sessions using the services of the network. To do so involves first the activation of a PDP context, after which data can be sent or received. Thus, when an outgoing or incoming session is initiated a PDP (packet data protocol) context is activated in the core network to serve the communication requirements of the session. The network elements to be used for the session are configured appropriately for the type of session—for example if the session involves a voice call, a data call or a voice-over-IP call the appropriate APN may be modified to include information on the requested service. If the session involves a data call then it will be routed via the SGSN and the appropriate GGSN as illustrated in FIG. 2. The GGSN generates one or more charging ticket messages (CDR messages) for the session, which are routed to the charging system appropriate to the mobile station. In the system of FIG. 1 many such messages may have been redundant since they related to sessions that were not to be billed for individually. In the system of FIG. 2, information on the charging profile is transmitted from the SGSN to the GGSN. This may be done at PDP context activation, in which case the SGSN need only send the information to the GGSN that has been selected to handle the session; or at another time. This signalling is illustrated at 31 in FIG. 2. In FIG. 2 the SGSN is shown as including a control unit 32 for handling that signalling. Such a control means may be a dedicated or shared hardware unit or may be provided essentially by software. The GGSN includes intelligent charging means 33 for storing the information and for modifying its generation of CDR tickets in dependence on the information. Those means may be in dedicated or shared hardware or in software.

The intelligent charging means is arranged to determine using the charging information received from the SGSN whether or not a particular PDP context is to be charged for individually. This may require knowledge by the GGSN of factors such as the APN of the PDP context and the current time of day. Some of that information may be available from the PDP context itself. If the PDP context is to be charged for individually (for instance if it is to be governed by a normal charginq regime) then the SGSN and the GGSN generate CDR ticket(s) for the PDP context as normal. However, if the PDP context is not to be charged for individually (for instance if it governed by a flat fee charging regime) then the SGSN and the GGSN do not generate CDR ticket(s) for the PDP context. In that case there is no need for the CDR tickets that would otherwise have been generated to be passed to the appropriate charging system, which could be in another core network. Thus the signalling load generated by the handling of CDR tickets can be dramatically reduced, especially in system where flat fee charging is common. For example, if system-wide pre-paid or flat fee charging were used the system of FIG. 2 could provide a great reduction in the signalling needed for charging ticket messages. These reductions in signalling would offer a corresponding reduction in the cost of setting up the networks because less signalling equipment would be required.

To implement the transmission of the subscriber information to the SGSN from the HLR elements could be provided in the MAP (mobile application part) message structure for HLR-SGSN signalling.

The APN used for a session could be used as a criterion for determining to which network element (NE) CDRs (e.g. prepaid CDRs) should be routed from a GGSN or a CGF (charging gateway functionality). It is possible to implement common subscriber profile definitions, which include services available to more than one subscriber. Such definitions could include APNs to which all subscribers having that profile are entitled to use (unless they are specifically denied that use by means of an exception).

In one preferred arrangement the (server) address to which CDRs are to be delivered from the CGF,(charging gateway functionality) could be defined according to charging profile/charging characteristics. For example, an independent functionality entity/server could be provided, that handles prepaid CDRs, which does not produce bills as the Billing System, but which decreases the account balance of a prepaid account (amount of money in pre-paid account) according to used network resources.

The present invention has been described with specific reference to the GPRS system and to the proposed UMTS third generation mobile telecommunications system. However, the invention is not limited to such systems and may be implemented with other systems and standards.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method, comprising:
    storing, at a subscriber information store, subscription information including charging arrangement information indicative of the charging arrangement for a first terminal operating in a telecommunications system;
    transferring the charging arrangement information to a packet data interface apparatus; and
    storing, at the packet data interface apparatus, the charging arrangement information;
    providing, by a packet data interface apparatus, one or more packet data communication services to the first terminal, the packet data interface apparatus being capable of interfacing between the first terminal and a packet-switched data link to a second terminal;
    receiving, at the packet data interface apparatus, data related to a usage of the one or more packet data communication services by the first terminal
    at the packet data interface apparatus, determining whether to generate charging messages based on a comparison of the data related to the usage of the one or more packet data communication services by the first terminal and the charging arrangement information stored at the packet data interface apparatus; and
    at the packet data interface apparatus, selecting, based on the determination, between not generating charging messages related to the usage of the one or more packet data communication services by the first terminal, and generating and transferring charging messages, wherein generating and transferring charging messages includes:
        generating one or more charging messages indicative of the usage of the one or more packet data communication services by the first terminal, and
        upon generation of one or more charging messages, transferring the generated charging messages to a charging apparatus.

2. A method as claimed in claim 1, wherein determining whether to generate charging messages includes:
    determining on the basis of the charging arrangement information for the first communication terminal stored at the packet data interface apparatus whether a communication with the first terminal is or is not liable to charging; and
    wherein generating and transferring charging messages is selected based on the communication being liable to charging, and
    wherein not generating charging messages is selected based on the communication being not liable to charging.

3. A method as claimed in claim 2, wherein determining on the basis of the charging arrangement information for the first communication terminal stored at the packet data interface apparatus whether a communication with the first terminal is or is not liable to charging is based on charging arrangement information for the first communication terminal stored at the packet data interface apparatus indicating that the communication is subject to flat rate payment.

4. A method as claimed in claim 2, wherein determining on the basis of the charging arrangement information for the first communication terminal stored at the packet data interface apparatus whether a communication with the first terminal is or is not liable to charging is based on charging arrangement information for the first communication terminal stored at the packet data interface apparatus indicating that the communication is subject to pre-payment.

5. A method as claimed in claim 2, wherein determining on the basis of the charging arrangement information for the first communication terminal stored at the packet data interface apparatus whether a communication with the first terminal is or is not liable to charging is based on charging arrangement information for the first communication terminal stored at the packet data interface apparatus indicating that the communication is free of charge.

6. A method as claimed in claim 2, wherein determining on the basis of the charging arrangement information for the first communication terminal stored at the packet data interface apparatus whether a communication with the first terminal is or is not liable to charging is based on a session itself indicating that the communication is free of charge.

7. A method as claimed in claim 1, wherein a first charging message of the generated one or more charging messages is indicative of at least one of a duration and type of the communication.

8. A method as claimed in claim 1, wherein a first charging message of the generated one or more charging messages is indicative of an amount of data transferred in the communication.

9. A method as claimed in any claim 1, wherein a first charging message of the generated one or more charging messages is indicative of an identity of the first communication terminal.

10. A method as claimed in claim 1, wherein each charging message of the generated one or more charging messages is a call detailed record (CDR) ticket.

11. A method as claimed in claim 1,
wherein transferring the charging arrangement information to the packet data interface apparatus is performed during attachment of the first terminal to the telecommunications system.

12. A method as claimed in claim 1, wherein the subscriber information store is a home location register.

13. A method as claimed in claim 12, wherein the home location register stores information indicative of access point names available to the first terminal, and the method further comprises accessing the point names available to the first terminal.

14. A method as claimed in claim 1, wherein the packet data interface apparatus is capable of interfacing between a packet radio connection with the first terminal and a packet-switched data link to the second terminal.

15. A method as claimed in claim 14, wherein the packet radio connection is a general packet radio service (GPRS) connection.

16. A method as claimed in claim 15, wherein the packet data interface apparatus comprises a serving GPRS support node (SGSN).

17. A method as claimed in claim 16, wherein the charging arrangement information for the first terminal is stored at the SGSN.

18. A method as claimed in claim 15, wherein the packet data interface apparatus comprises a gateway GPRS support node (GGSN).

19. A method as claimed in claim 18, wherein the charging arrangement information for the first terminal is stored at the GGSN.

20. A method as claimed in claim 16, wherein the step of transferring the charging arrangement information to the packet data interface apparatus comprises transferring the charging arrangement information to the serving GPRS support node (SGSN), and
wherein the charging apparatus performs a charging operation to attribute to a subscriber for the first terminal a charge for use of the one or more packet data communication services by the first terminal.

21. A method as claimed in claim 20, wherein the packet data interface apparatus further comprises a serving GPRS support node (SGSN) and the method further comprises the step of transferring the charging arrangement information from the SGSN to the GGSN.

22. A method as claimed in claim 21, wherein the said step of transferring the charging arrangement information from the SGSN to the GGSN is performed if it is determined that the communication is subject to hot billing.

23. A method as claimed in claim 18, wherein the packet data interface apparatus further comprises a serving GPRS support node (SGSN) and wherein the step of determining whether a communication with the first terminal is liable to charging is performed by at least one of the SGSN and the GGSN.

24. A method as claimed in claim 23, wherein the said step of generating the charging messages is performed by at least one of the GGSN and SGSN.

25. A method as claimed in claim 1, wherein the telecommunications system is a universal mobile telecommunications system (UMTS).

26. A system, comprising:
a subscriber information store configured to store subscription information including charging arrangement information indicative of the charging arrangement for a first terminal operating in a telecommunications network;
packet data interface apparatus configured to:
interface between the first communication terminal and a packet-switched data link to a second terminal;
provide one or more packet data communication services to the first terminal;
receive charging arrangement information for the first terminal,
store the charging arrangement information for the first terminal,
receive data related to a usage of the one or more packet data communication services by the first terminal,
determine whether to generate charging messages based on a comparison of the data related to the usage of the one or more packet data communication services by the first terminal and the charging arrangement information stored at the packet data interface apparatus, and
based on the determination, select between generating one or more charging messages indicative of the usage of the one or more packet data communication services by the first terminal, and not generating charging messages related to the usage of the one or more packet data communication services by the first terminal;
message transfer apparatus configured to transfer charging messages generated by the packet data interface apparatus to a charging apparatus capable of performing a charging operation to attribute to a subscriber associated with the first terminal a charge for the usage of the one or more packet data communication services by the first terminal.

27. A method, comprising:
storing, in a packet data interface apparatus, charging arrangement information indicative of a charging arrangement for a first terminal operating in a telecommunications network, the packet data interface apparatus capable of interfacing between the first terminal and a packet-switched data link to a second terminal;
providing, using the packet data interface apparatus, one or more packet data communication services to the first terminal;
receiving, at the packet data interface apparatus, data related to a usage of the one or more packet data communication services by the first terminal;
determining, at the packet data interface apparatus, whether to generate charging messages based on a comparison of the data related to the usage of the one or more packet data communication services by the first terminal and the charging arrangement information stored at the packet data interface apparatus; and at the packet data interface apparatus, selecting, based on the determination, between not generating charging messages related to the usage of the one or more packet data communication services by the first terminal, and generating and transferring charging messages, wherein generating and transferring charging messages includes:
- generating one or more charging messages indicative of the usage of the one or more packet data communication services by the first terminal, and
- upon generation of one or more charging messages, transferring the generated one or more charging messages from the packet data interface apparatus to a charging apparatus.

28. A system comprising:

a serving GPRS (gateway packet radio system) support node (SGSN); and a gateway GPRS support node (GGSN);

wherein the system is configured to:
- provide one or more packet data communication services to a first terminal operating in a telecommunications network;
- interface between the first terminal and a packet-switched data link to a second terminal;
- receive charging arrangement information for the first terminal;
- store the charging arrangement information for the first terminal in at least one of the SGSN and the GGSN;
- receive data related to a usage of the one or more packet data communication services by the first terminal;
- in at least one of the SGSN and the GGSN, determine whether to generate charging messages based on a comparison of the data related to the usage of the one or more packet data communication services by the first terminal and the charging arrangement information stored in at least one of the SGSN and the GGSN; and
- in at least one of the SGSN and the GGSN, select, based on the determination, between not generating charging messages related to the usage of the one or more packet data communication services by the first terminal, and generating and transferring charging messages, wherein generating and transferring charging messages includes:
  - generating one or more charging messages indicative of the usage of the one or more packet data communication services by the first terminal, and
  - transferring generated charging messages from the packet data interface apparatus to a charging apparatus.

\* \* \* \* \*

UNITED STATES PATENT AND TRADEMARK OFFICE
CERTIFICATE OF CORRECTION

| | | |
|---|---|---|
| PATENT NO. | : 7,970,376 B2 | Page 1 of 1 |
| APPLICATION NO. | : 11/930950 | |
| DATED | : June 28, 2011 | |
| INVENTOR(S) | : Tuija Hurtta et al. | |

It is certified that error appears in the above-identified patent and that said Letters Patent is hereby corrected as shown below:

Title Page, item (63):

Related U.S. Application Data:
    Please delete "09/889,862" and insert --09/889,682--

Column 9, Claim 9, Line 13:
    Please delete "any"

Signed and Sealed this
Seventh Day of February, 2012

David J. Kappos
*Director of the United States Patent and Trademark Office*